Figure 1:
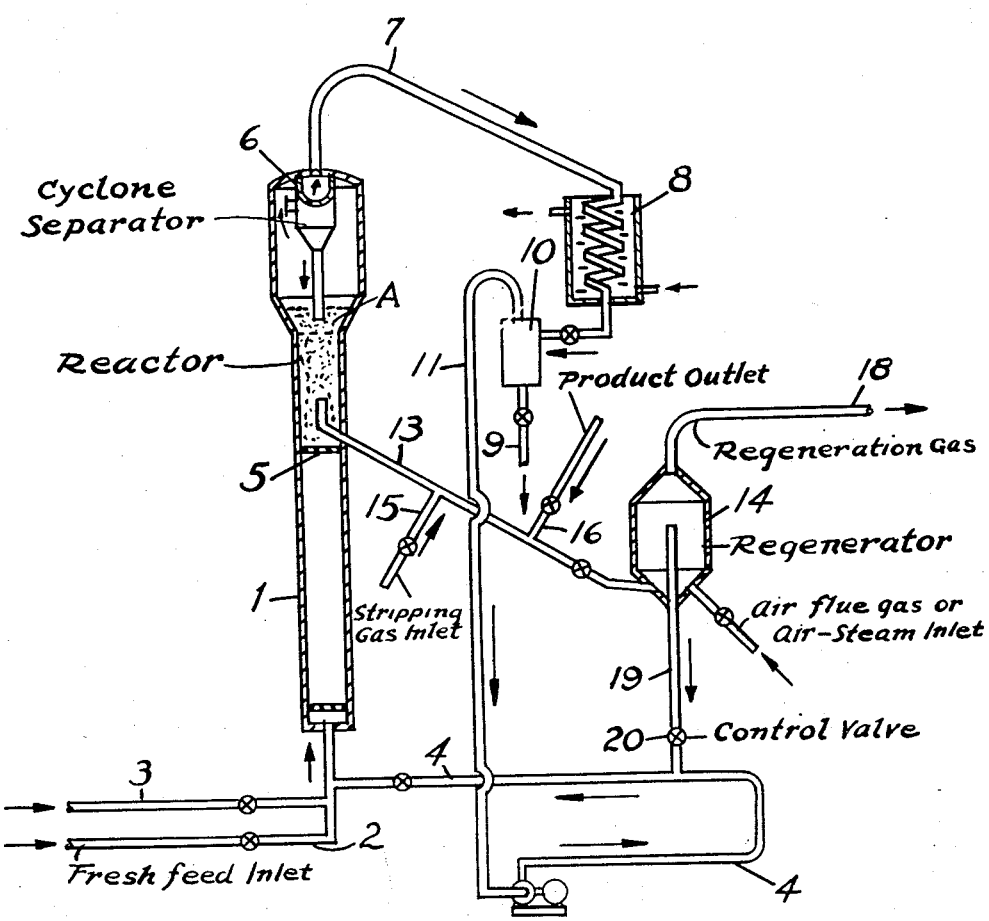

FIG.—1

Nov. 14, 1950  C. H. HOLDER  2,530,243
HYDROCARBON SYNTHESIS
Filed Sept. 7, 1946  2 Sheets-Sheet 2

Clinton H. Holder Inventor
By  J. L. Small  Attorney

Patented Nov. 14, 1950

2,530,243

UNITED STATES PATENT OFFICE 2,530,243

HYDROCARBON SYNTHESIS

Clinton H. Holder, Cranford, N. J., assignor to Standard Oil Development Company, a corporation of Delaware Application September 7, 1946, Serial No. 695,525

1 Claim. (Cl. 260—449.6)

The present invention is concerned with processes relating to the contacting of subdivided fine solid particles and gases. It also pertains more particularly to a process of, and an apparatus for contacting solids with upflowing gases in which the gases pass through an enlarged contacting chamber containing a body of subdivided fine solids at a controlled rate to maintain the subdivided solids in a fluid phase, which phase is in a relatively turbulent, fluid ebullient state.

The invention is more specifically directed to an improved hydrocarbon synthesis reaction wherein the carbon content of the catalyst is positively controlled by employing a selective procedure for the withdrawal of the catalyst from the treating zone. In accordance with the specific application of my invention carbon build-up on the catalyst in hydrocarbon synthesis reactions is controlled by employing a two vessel system in which one vessel comprises the reactor or treating zone, while the other vessel comprises a regeneration zone. The catalyst of the highest carbon content is selectively circulated to the regeneration zone, preferably by placing packing, restrictions, or equivalent means in the upper part of the fluid phase in the treating zone.

It has, heretofore, been known in the art to contact gases and solids by passing the gases upwardly through an enlarged treating zone, containing a body of finely divided solids to be contacted, at a controlled velocity to maintain the solids in the treating zone in a quasi-liquid like state. Under properly controlled conditions, the subdivided solid particles are not only maintained in a highly turbulent, quasi-liquid and ebullient state, but there exists a rapid and overall circulation of the fluidized solids throughout the fluid bed.

Processes of this character, wherein fluidized solids are contacted with gases, have a number of inherent and important advantages. For example, intimate contact between the gases and the fluid subdivided solids is secured. It is also possible to maintain a substantially uniform temperature throughout the bed as a result of the extremely rapid transfer of heat from one section of the bed to the other because of the rapid circulation of the fluid subdivided solids. Furthermore, due to the rapid transfer of heat between the solids under these conditions, it is possible to readily add or extract heat from the mass at an extremely rapid rate.

Fluid operations of the character described for contacting fine subdivided solids and gases have found extensive application in various reduction reactions, polymerization processes, exothermic and endothermic reactions, processes for the carbonization of finely divided coal and similar operations. Specific processes in which the solid fluid technique had been very successfully employed, are processes involving the treatment of petroleum oils, such as catalytic cracking operations, polymerization operations, and the like. The fluid technique has also been successfully utilized in synthesis of hydrocarbons, such as the Fischer Synthesis reactions both for the production of synthesis gas itself and for the reaction of oxides of carbon and hydrogen for the production of hydrocarbon constituents containing one or more carbon atoms in the molecule. Thus, while the contacting of finely divided solids and gases in a fluidized bed, as presently practiced, has found extensive application, there are certain inherent limitations in some of the processes as now practiced which have thus far prevented adaptation in many other fields and which have limited its efficiency in many fields in which it is now employed.

In some operations, for instance as in hydrocarbon synthesis operations, the overall rapid, swirling effect obtained by the circulation of solids through the reaction zone may be undesirable because it is not possible to segregate and separate from the reaction zone, a stream of solids which are anything more than an average mixture of solids contained in the zone. Also, in many processes it is desirable to carry out the operations in truly countercurrent fashion in which the solids pass through the contacting zone in a general direction countercurrent to the flow of the gas. This is particularly true when it is desired to remove spent material from the treating zone rather than an average equilibrium mixture of solids contained in the zone, such as in purification and separation of gases and in the calcination and distillation of solids. Also, in other operations it is of advantage to carry out the process with concurrent flow of solids and gases. Concurrent conditions of operation are unobtainable in carrying out the contacting operation in a free, unconfined fluid bed as presently practiced. Furthermore, there is a practical limit to the depth of the fluid bed which may be used. It has been found that, if the bed is excessively deep, a surging and pounding of the bed results which leads to decreased treating efficiency. It is also desirable in some cases to pass the gases to be treated or contacted successively through two separate fluidized beds in open free communication with each other. It has also been found that in carrying out the contacting of gases and solids in a fluidized bed reactor of the type described, all excess gas, in addition to that which is used to fluidize the solids, tend to agglomerate rapidly into large bubbles which find their way through the bed with imperfect contact with the subdivided solids.

One purpose of my invention is to provide an improved method of, and apparatus for carrying out the contacting of gases and solids in the presence of a fluidized bed of the type described which would not be subject to the limitations mentioned. Another important object of my invention is to provide an improved method of rapidly and effectively separating fractions of subdivided solids of different buoyant properties or particle weights. Another object of my invention is to provide an improved method of maintaining two or more separate and contiguous beds of subdivided solids in open communication with each other. Another specific object of my invention is to provide an improved method of contacting gases with a relatively deep bed of fluidized solids. My invention is more specifically directed to improved hydrocarbon synthesis reactions, the scope of which will be understood by subsequent descriptions. My invention finds general application in any operation wherein it is desirable to contact fine, subdivided solids with gases in order to effect a physical or chemical change in either solids or the gas.

In accordance with a specific and limited application of my invention, substantial improvements are secured in a hydrocarbon synthesis reaction. In accordance with my process, substantial economies are secured by utilizing a novel operating technique wherein carbon build-up on the catalyst is controlled by selectively removing the more buoyant catalyst particles having the highest carbon concentration from the reaction zone, which catalyst is regenerated in a regeneration zone and returned to a lower section of the synthesis zone.

It is well known in the art to conduct hydrocarbon synthesis reactions by contacting hydrogen and oxides of carbon with catalysts under various temperature and pressure conditions. The catalyst employed is usually selected from the iron group metals, as for example, iron, cobalt and nickel. The catalysts are utilized either alone or are employed in conjunction with carriers, such as kieselguhr, diatomaceous earth, synthetic gels, silica, and alumina. Promoters, such as oxides of chromium, zinc, aluminum, magnesium and carbonates of the alkali metals are used with the iron group metals. These catalysts are employed in either fixed bed or fluid catalyst operations.

The temperatures employed in the synthesis reaction vary widely, as for example, in the range from about 300° F. to about 800° F. and are generally in the range from about 350° F. to about 700° F. The pressures, likewise, vary considerably and are a function of other operating conditions, such as catalyst employed, activity of the catalyst, character of the feed gases and the temperatures utilized. Pressures in the range from about 1 to 100 and higher atmospheres have been suggested. The character of the feed gases introduced into the synthesis reaction zone depends somewhat on the particular temperatures and pressures, and upon the catalyst employed. For example, when employing cobalt type catalyst, it is preferred to use about 1 mol of carbon monoxide to about 2 mols of hydrogen, while when an iron catalyst is utilized, equal mols of hydrogen and carbon monoxide in the feed synthesis gases are desirable.

The synthesis feed gases comprising hydrogen and carbon monoxide are usually produced from hydrocarbons, particularly from methane or from natural gas. The reaction comprises, generally, oxidizing hydrocarbons with a reducible metal oxide. This procedure, per se, is old in the art since there are many disclosures concerned with the use of reducible metal oxides, such as oxides of iron, chromium, copper, nickel, manganese, and zinc for the oxidation of hydrocarbons comprising methane to produce hydrogen and oxides of carbon, particularly, carbon monoxide. These reactions are generally conducted at temperatures in the range from about 1400° F. to about 2000° F.

My invention finds specific application in a hydrocarbon synthesis reaction wherein the synthesis gases are reacted by means of a suitable catalyst to form hydrocarbon constituents containing more than one carbon atom in the molecule. For example, in this process one of the important problems confronting the development of the synthesis process is that carbon builds up on the catalyst to an extent that it is lost unless it is regenerated. Although, a certain amount of carbon may be desirable on the catalyst surface, this factor must be controlled, otherwise the catalyst deteriorates with a resultant loss of selectivity. For instance, as the carbon content of the catalyst increases, there is a progressive trend toward lighter hydrocarbons, including methane, in the product vapors. In accordance with my process I therefore, can effectively control the character of the product gases and vapors by controlling the carbon content of the catalyst in the treating zone. As the carbon content of the catalyst increases, the catalyst particles become more buoyant and tend to concentrate in the upper areas of the treating zone, while the relatively less carbonized catalyst particles, which are less buoyant, tend to concentrate in the lower areas of the treating or synthesizing zone. In accordance with my invention I preferentially withdraw from the synthesis zone catalyst of only the highest carbon content rather than a composite catalyst.

Figure 2:
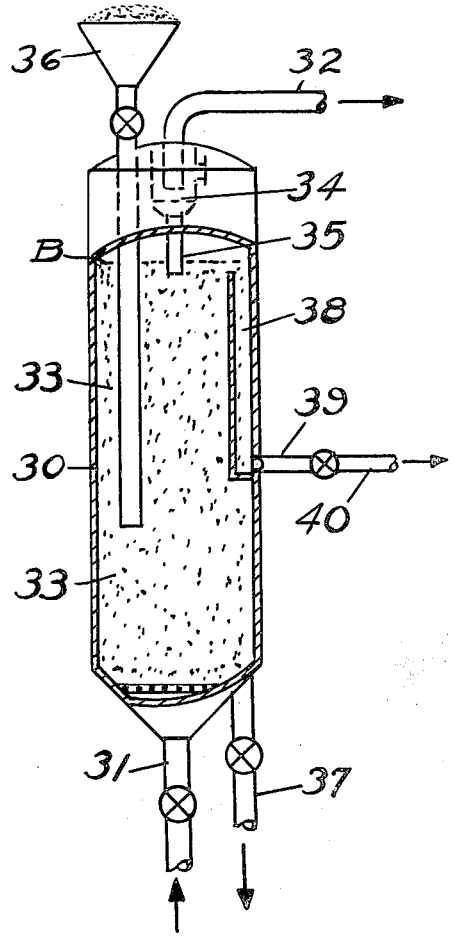
Figure 3:
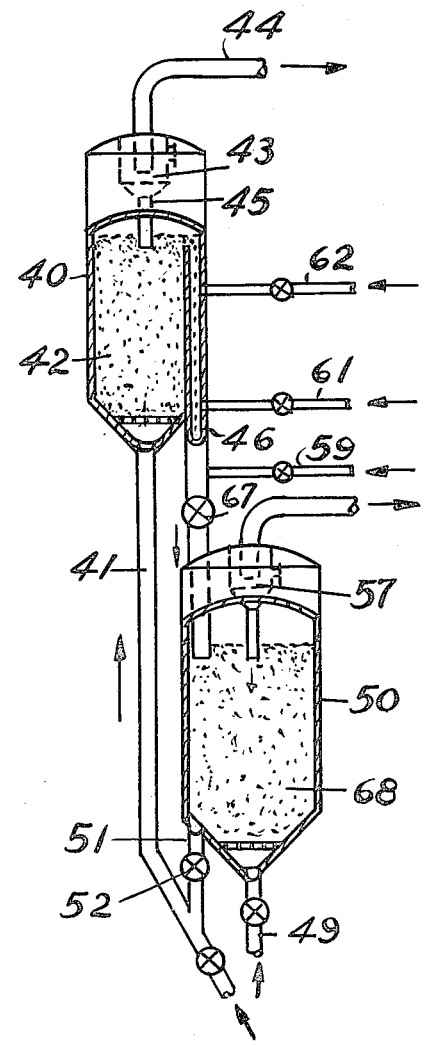

The process of my invention may be readily understood by reference to the attached drawings illustrating modifications of the same. Fig. 1 is a schematic sketch wherein the suspended catalyst is introduced at the bottom of the treating zone, and wherein only one section, that is, the upper section contains packing. Fig. 2 illustrates a modification of my invention wherein the entire treating zone contains packing. Fig. 3 illustrates an adaptation of my invention showing both the treating zone and the regeneration zone with packing.

Referring specifically to Fig. 1, feed gases comprising carbon monoxide and hydrogen are introduced into treating zone 1 by means of feed line 2. Prior to introducing these feed gases into treating zone 1 small particles of a suitable synthesis catalyst are introduced by means of line 3. Regenerated catalyst handled in a manner as hereinafter described is also introduced into the feed gases by means of line 4. These gases flow upwardly through the lower section of reactor 1 which does not contain packing material. The catalyst particles in general have a micron size in the range from about 20 to 200 microns and higher. The velocity of the gas flowing up through reactor 1 is sufficient to maintain the subdivided solid particles in a fluid ebullient state. At an intermediate point in reactor 1 a supporting screen 5 supports suitable nonfluidized packing material in the upper section of the treating zone. The treated gases flow upwardly through the packed zone, through cyclone separator or equivalent means 6 and are withdrawn from the treating zone by means of line 7. Cyclone separation or equivalent means 6 functions to remove entrained solid particles from the reactant gases. The overhead product removed by means of line 7 is condensed in condensing zone 8, passed to separation zone 10 wherein a separation is made between the condensate and the uncondensed gases. The condensate product is removed by means of line 9 and handled in any manner desirable while the uncondensed gases are removed by means of line 11 and recycled to the bottom of treating zone 1 by means of pump or blowers 12.

The upper level of the fluid synthesis catalyst in treating zone 1 is maintained at point A. Thus, the amount of fresh catalyst introduced by means of line 3 is merely sufficient to make up for that catalyst which is not recirculated. In accordance with my invention the catalyst of higher density containing relatively little carbon contamination concentrates in the lower area of treating zone 1 while the catalyst of lower density containing a relatively high percentage of carbon concentrates in the upper area, particularly in the packed area of treating zone 1. In accordance with my invention I withdraw from the packed area this relatively high carbonized catalyst by means of line 13 and pass the same to regeneration zone 14. Inert stripping gas may be introduced by means of lines 15 and 16. An oxidizing gas, such as, flue gas or, an air stream is introduced into the lower section of regeneration zone 14 by means of line 17. Gases are removed from regeneration zone 14 by means of line 18 while the regenerated catalyst is removed by means of line 19, passed through control valve 20 and recycled to treating zone 1 by introducing this catalyst with the recycled gas.

Referring specifically to Fig. 2, reference character 30 designates a reaction chamber which is adapted to contact synthesis feed gases with fluidized subdivided solid synthesizing catalyst. Reactor 30 is provided with a gas inlet 31 through which synthesis gases comprising carbon monoxide and hydrogen are introduced. Reactor 30 is also provided with a gas exit 32 through which reactant gases may be withdrawn from the treating zone. Reactor 30 is adapted to contain a fluidized bed of subdivided catalyst particles. Gases are caused to pass upwardly through the bed at a controlled rate. For example, when using finely divided catalyst solids having a particle size ranging from about 30 to about 200 microns and higher, the velocity of the gases passing through the bed may be of the order from about 0.1 to 5 ft. per second, depending upon the density of the solid particles being contacted. Under these conditions the solid particles are suspended in the gas stream and take on the characteristics of a quasi-liquid.

In accordance with my invention, there is placed within the reaction space of chamber 30 packing elements 33 of the type hereinafter described which are adequately spaced to provide free passage for the upflowing gases. The packing is of the character which permits the maintenance of a fluid-like body of suspended solids between the spaces of the packing elements. The packing elements may be in the form of balls, spheres, cylinders, U-shaped elements, saddles, coils, metal turnings, helices, or equivalents. These packing elements are of sufficient sizes and weight to prevent being suspended in the gas vapors passing upwardly through the reactor. The presence of these packing elements within the reaction zone tends to prevent overall swirling or recirculation of the suspended solid particles within the reaction zone. At the same time the formation of gas bubbles is avoided or if they are formed, they are dispersed so that a more intimate contact between the gases and solids is obtained.

As previously pointed out, the gases are introduced into reaction zone 30 by means of line 31, passed upwardly through the reaction zone, and are withdrawn from the same by means of line 32. Cyclone separator 34, or equivalent means is provided in the upper portion of the reaction chamber for removing entrained solids from the gases. The solids are returned to the fluid bed in the reactor through conduit 35. Solid catalyst particles to be contacted with the gas may be discharged into reaction zone 30 by means of hopper 36. The catalyst solids discharged into reaction zone 30 tend to pick up carbon with the result that they become more buoyant and tend to concentrate in the upper section of reaction zone 30. Although, I may withdraw suspended catalyst particles from reaction zone 30 through conduit 37, I prefer to selectively remove the catalyst containing the highest carbon content through internal conduit 38 and pass these relatively high carbon content catalyst particles to a regeneration zone by means of line 39 and valve 40. In the regeneration zone means are provided to remove the carbon and to recycle the regenerated catalyst to hopper 36.

Referring specifically to Fig. 3, synthesis feed gases comprising carbon monoxide and hydrogen are introduced into the bottom of treating zone 40 by means of line 41. Regenerated catalyst secured in the manner as hereinafter described, is withdrawn from regeneration zone 50 by means of line 51, passed through valve 52, and introduced into line 41. Thus, the feed gases and the regenerated catalyst pass into the bottom of treating zone 40 which contains packing elements 42. The velocity of upflowing gas is sufficient to maintain the subdivided catalyst particles in a fluidized condition. The reactant gases are passed through cyclone, or equivalent means, 43 and withdrawn from the system by means of line 44. Small particles removed from the reactant gases in zone 43 are returned to the fluid bed by means of conduit 45. As the catalyst becomes more contaminated with carbon, the small particles become more buoyant and thus tend to concentrate in the upper area of zone 40. In accordance with my invention, I propose to withdraw these catalyst particles of the highest carbon concentration from the upper area of zone 40 by means of internal conduit 46. These particles are passed through valve 67 into regeneration zone 50. Gases may be introduced into conduit 46 by means of lines 61 and 62 in order to aerate the catalyst. Oxygen containing gases are introduced into regeneration zone 50 by means of line 49. These gases oxidize the carbon on the catalyst as it flows downwardly between the interstices of packing elements 68 maintained in zone 50. Reactant gases are withdrawn from zone 50 by passing the same through a cyclone separator or equivalent means 57 and then through line 58.

The process as described may be somewhat modified. Different size packing may be used in different sections of the tower to further aid the separation of the more buoyant, highly carbonized catalyst particles from the less buoyant, less carbonized particles. Equivalent means may be used, as for example, constrictions in the zone itself, or cooling tubes, heat transfer tubes, and the like. The regenerator may be a vessel wherein partial removal of the carbon on the catalyst is obtained by oxidation with air. Temperature, air rate, and the catalyst circulation rate may be controlled to give a carbon concentration on the catalyst leaving the regenerator for recycling to the reactor of from about 10% to about 15% by weight. Under these conditions, oxidation of the iron would not occur and the catalyst could be returned directly to the synthesis reactor. By operating in accordance with my process, catalyst circulation is reduced to a minimum since only that catalyst which requires reduction in carbon content is circulated. This reduces the catalyst attrition in transfer lines and reduces the size of the regeneration equipment.

It is within the scope of my invention to employ packing both in the regeneration and in the synthesis zones. It is also within the scope of my invention to employ packing only in the synthesis zone and to permit overall circulation of the particles in the regeneration zone.

It is to be understood that my invention will find application in operations in which it is desired to carry out the operation with either concurrent or countercurrent flow of one phase of the powder with respect to the gases. The invention is directed and is applicable to all processes in which solids and gases are contacted, and in which the gases to be treated or contacted are passed upwardly through an enlarged reaction zone containing a body of finely divided solid particles maintained in two phases at a velocity sufficient to maintain the finely divided solid particles in a fluidized, quasi-liquid or ebullient state. My invention is applicable to operations in which the finely divided solids are continuously introduced into the reaction zone and a stream of solid particles is continuously removed therefrom, as well as to operations in which a body of finely divided solids is maintained within the treating zone.

In accordance with a modification of the present invention, the reaction zone is filled, or partially filled, with packing or dispersing elements adequately spaced to provide a labyrinth of discontinuous passageways in which the gases are in contact with the finely divided solids, which are maintained in a quasi-liquid condition. These dispersing or packing elements prevent the overall swirling or rapid circulation of the solids throughout the full length and depth of the reactor, and also tend to break up and disperse the larger gas bubbles which tend to form. Furthermore, the presence of these dispersing or packing elements provide, among other things, more intimate and better contact between the solids and gases than would be the case where the dispersing elements are omitted.

The size and character of the packing, as well as, its employment in the treating zone may vary appreciably. For example, the packing or dispersing elements may be dumped in the reaction or treating zone in a random fashion, or these packing elements may be made to assume predetermined geometric patterns. In cases where it is desired merely to avoid rapid overall recirculation of the solid particles throughout the reaction zone, the packing elements may be so spaced as to avoid extended uninterrupted flow of the gases through the reactor while permitting substantial vertical flow without interruption. Where it is desired to break up the formation of large bubbles and to maintain two phases, the packing and spacing elements may be so arranged as to prevent extended and uninterrupted vertical flow of the gases through the reaction zone. The dimensions and the type of the packing elements utilized may be varied considerably, depending upon the type of the reactor employed, the velocity used, the particular reaction being carried out and the character and particle size of solids being suspended. In general, the packing may vary from a minimum dimension of ¼ inch to a maximum dimension of 12 inches or more. Packing elements of the saddle type, having a maximum diameter of 1 inch to 2 inches (for example, Berl Saddles), are particularly suitable for most reactors or treating zones. The packing or spacing elements should be shaped and arranged within the reactor so as to avoid extended horizontal surfaces on which the solid particles undergoing treatment can settle and collect.

The reaction zone or treating chamber may have packing elements of different sizes in different vertical sections of the chamber. For example, the upper section of the chamber may be filled with relatively small packing elements and the bottom section filled with relatively coarse packing elements. In some cases it might be of advantage to have the coarse packing at the top and the fine at the bottom. Different size packing in top and bottom of the contacting zone is of particular advantage in effecting separation and classification of subdivided solids, and when it is desired to maintain two separate and distinct beds or a gradient of fluidized solids in a single reactor.

When the space occupied by the packing is not an important factor, the packing elements may be in the form of solid balls, spheres, cylinders, blocks, bricks and the like. However, where it is important to provide maximum reactor space with minimum volume occupied by the packing or spacing elements, it is preferable to provide elements which give a maximum surface. These elements may, for example, be in the shape of hollow cylinders, U-shaped elements resembling saddles, wire turnings, wire helices and the like. Raschig rings may be used as such. When using wire helices as packing elements, it is preferred to provide burs or crimps in the wire as base points around the circumference to avoid interlocking of coils. When using saddle shaped elements, the elements should be designed to prevent close nesting of one saddle in another.

The packing or spacing elements may be made of any desired material capable of withstanding the conditions of operation. In cases where the reactor is adapted to carry out catalytic reactions, the spacing elements may or may not have catalytic activity. The elements may also be of heat conducting materials such as metals, for example, aluminum or other heat conducting material in cases where it is necessary to provide rapid heat transfer to various sections of the reaction zone.

In order to successively maintain a quasi-liquid phase of subdivided gases and solids in the passageways between the packing elements, the subdivided solids or powder should be of such character as to be able to flow freely down through the interstices of the packing elements without becoming packed or agglomerated in the absence of an upflowing fluid. This quality of free flowing in the interstices of the packing in the absence of a suspending fluid is a function of factors, among which include the density of the subdivided particles, particle size, cntacting zone size with respect to length as to width and particle size distribution. Thus, the finely divided solids used in the present invention must be of such particle size distribution so as to be free flowing without the aid of aeration. By this is meant for example, that if a body of said solids having all sides and the bottom supported, has the support on one side removed, the body will flow out that side in such a way as to leave a substantially, uniformly inclined surface. As pointed out heretofore, the body is free flowing if it will flow downwardly freely through the packing in the absence of aeration without bridging. In general, this characteristic is influenced by the content of fines in the subdivided solids having a diameter less than about 20 microns. Usually the content of such fines should not be greater than about 12% by volume since a percentage greater than this will render subdivided particles having particle distribution in the range from about 20 microns to 200 microns nonfree flowing. If the subdivided particles are free flowing, it is possible to fluidize the subdivided particles in the interstices of the packing regardless of the relative sizes of the packing, and the particle sizes of the subdivided particles providing the packing is sufficiently large to provide interstices each having a diameter greater than the diameter of the largest particle in the subdivided solids. In general, the packing should be such as to provide interstices having a length as compared to diameter of not greater than 15 to 1. Also, the packing should be at least about 10 times as large as the largest particle to be fluidized.

A further illustration of free flowing subdivided solids in the absence of aeration with respect to its successful fluidization between the interstices of solid nonfluidized packing in a treating zone is shown by the following data. The catalyst used was a silica gel catalyst impregnated with alumina (approximately 87½% silica and 12½% alumina).

| Silica-Alumina Catalyst Micron Size | Operation A | Operation B |
| --- | --- | --- |
| 0–10 | 6.8 | 3.2 |
| 10–20 | 8.8 | 7.3 |
| 20–40 | 19.1 | 24.1 |
| 40–80 | 36.8 | 35.8 |
| 80+ | 28.5 | 29.6 |
| Free Flowing Through Interstices of Packing (No Aeration) | No | Yes |
| Successful Fluidization in Interstices of Packing | ¹ No | Yes |

¹ Secured surging and channeling.

In these and similar operations, the reactor size with respect to length as compared to width was 15 to 1 or less. The packing comprised commercial packing of the size from about ¼ to 12 inches, generally, in the range from ¼ to about 2 inches. Commercial type packings were used, such as Berl Saddles. The velocity¹ of upflowing gas was in the range from about 0.1 to 1.5 feet per second.

As another example, an iron catalyst having a micron size less than 44 was not free flowing in the absence of aeration through the interstices of the packing. This iron catalyst could not be successfully fluidized in a packed zone. On the other hand, an iron catalyst having a micron size in the range from about 100 to 250 flowed freely ¹ Velocity in the treating zone provided no solids are present.

through the interstices of the packing and could be successfully fluidized.

Also, if a silica catalyst impregnated with alumina, as previously described, has a uniform micron size of about 45, it will neither flow freely between the interstices of packing, nor can it be successfully fluidized.

A further test of a free flowing body is that if such a body is packed under its own weight in a 60° funnel, it will flow through the funnel freely when released at the bottom. Whether or not small subdivided particles are free flowing will vary with different materials as described heretofore. However, its free flowing characteristics in the absence of aeration may be readily determined by a simple test of the character indicated above. If a finely divided solid material is not free flowing it can be made so by adjusting its particle distribution.

Having described the preferred embodiment of my invention, it will be understood that it embraces such other variations and modifications as come within the spirit and scope thereof.

I claim:

Improved hydrocarbon synthesis process which comprises introducing feed gases comprising carbon monoxide and hydrogen into a reaction zone containing an iron-type synthesis catalyst tending to form fixed carbon deposits and to disintegrate at synthesis conditions, said catalyst comprising finely divided solid particles which are maintained in a fluid ebullient state within the reaction zone due to the velocity of the upflowing feed gases, said zone containing solid non-fluidizable packing elements in its upper portion, maintaining temperature and pressure conditions within said reaction zone to produce hydrocarbon constituents containing more than one carbon atom in the molecule, said conditions being conducive to the formation of carbon on said catalyst, whereby the carbon content of said catalyst increases, and increases the buoyancy of said catalyst, catalyst particles which have become more buoyant tending to concentrate in the upper packed areas of said reaction zone and relatively less carbonized and less buoyant catalyst particles tending to concentrate in the lower areas of said reaction zone, withdrawing from said upper packed areas of said reaction zone the more buoyant catalyst particles, passing the same to a regeneration zone, subjecting the catalyst particles in said regeneration zone to a treatment with an oxidizing gas at conditions adapted to remove carbon, and returning regenerated catalyst particles from said regeneration zone to said reaction zone at a point in said reaction zone below said packed area and free of packing elements.

CLINTON H. HOLDER.

REFERENCES CITED

The following references are of record in the file of this patent:

UNITED STATES PATENTS

| Number | Name | Date |
| --- | --- | --- |
| 2,360,787 | Murphree et al. | Oct. 17, 1944 |
| 2,409,476 | Creelman et al. | Oct. 15, 1946 |
| 2,425,098 | Kassel | Aug. 5, 1947 |
| 2,444,990 | Hemminger | July 13, 1948 |
| 2,447,505 | Johnson | Aug. 24, 1948 |
| 2,455,419 | Johnson | Dec. 7, 1948 |